US010795925B2

(12) United States Patent
Verkasalo et al.

(10) Patent No.: US 10,795,925 B2
(45) Date of Patent: Oct. 6, 2020

(54) METHOD, DEVICE AND ARRANGEMENT FOR MEASUREMENT OF APP USAGE BASED ON VISUAL CHARACTERISTICS

(71) Applicant: Verto Analytics Oy, Espoo (FI)

(72) Inventors: Hannu Verkasalo, Engelberg (CH); Mika Ristimäki, Espoo (FI); Matias Kontturi, Espoo (FI); He Zhang, Espoo (FI)

(73) Assignee: Verto Analytics Oy, Espoo (FI)

( * ) Notice: Subject to any disclaimer, the term of this patent is extended or adjusted under 35 U.S.C. 154(b) by 269 days.

(21) Appl. No.: 15/766,653

(22) PCT Filed: Oct. 8, 2015

(86) PCT No.: PCT/FI2015/050675
§ 371 (c)(1),
(2) Date: Apr. 6, 2018

(87) PCT Pub. No.: WO2017/060559
PCT Pub. Date: Apr. 13, 2017

(65) Prior Publication Data
US 2019/0065496 A1    Feb. 28, 2019

(51) Int. Cl.
*G06F 16/48*  (2019.01)
*H04L 29/08*  (2006.01)
*G06F 11/34*  (2006.01)
*G06F 16/438*  (2019.01)
*G06F 16/44*  (2019.01)
(Continued)

(52) U.S. Cl.
CPC .......... *G06F 16/48* (2019.01); *G06F 11/3438* (2013.01); *G06F 16/438* (2019.01); *G06F 16/44* (2019.01); *G06F 16/951* (2019.01); *G06K 9/6201* (2013.01); *G06K 9/6255* (2013.01); *H04L 67/22* (2013.01)

(58) Field of Classification Search
CPC .... G06F 16/48; G06F 11/3438; G06F 16/438; G06F 16/44; G06F 16/951; G06K 9/6217; G06K 9/6255; G06K 9/6201
See application file for complete search history.

(56) References Cited

U.S. PATENT DOCUMENTS 6,108,637 A * 8/2000 Blumenau ............... H04L 43/08
                                                                    715/204
7,523,191 B1 * 4/2009 Thomas .............. G06F 11/3438
                                                                    709/202

(Continued)

*Primary Examiner* — Mohammed R Uddin
(74) *Attorney, Agent, or Firm* — Berggren LLP

(57) ABSTRACT

Method for supplying data to remotely cultivate a digital content reference library, to be executed by an electronic terminal device capable of visually displaying digital content to a user and communicating with a communications network, comprising establishing, by automatic observation logic, visual characteristics data representing the on-screen appearance of digital content, such as application, shown via a display of the terminal device (406), and transmitting the visual characteristics data to a remote server for updating a digital content reference library thereat linking content identity information with associated visual characteristics data in the received or processed form (408). A compatible method to be executed on the network side is presented as well as related, applicable terminal devices and server arrangements.

20 Claims, 3 Drawing Sheets

(51) Int. Cl.
*G06F 16/951* (2019.01)
*G06K 9/62* (2006.01)

(56) References Cited

U.S. PATENT DOCUMENTS

| | | | |
|---|---|---|---|
| 2005/0086255 A1* | 4/2005 | Schran | G06F 11/34 |
| 2007/0204078 A1* | 8/2007 | Boccon-Gibod | G06F 21/10 |
| | | | 710/54 |
| 2008/0133287 A1* | 6/2008 | Slattery | G06F 11/3419 |
| | | | 705/32 |
| 2012/0047509 A1* | 2/2012 | Ben-Itzhak | G06F 9/50 |
| | | | 718/103 |
| 2012/0278330 A1* | 11/2012 | Campbell | G06F 16/48 |
| | | | 707/740 |
| 2013/0123667 A1* | 5/2013 | Komatireddy | A61B 5/0002 |
| | | | 600/595 |
| 2013/0268357 A1* | 10/2013 | Heath | H04L 63/00 |
| | | | 705/14.53 |
| 2014/0075004 A1* | 3/2014 | Van Dusen | G06Q 30/0201 |
| | | | 709/223 |
| 2014/0075371 A1* | 3/2014 | Carmi | G06F 11/3438 |
| | | | 715/781 |
| 2015/0003963 A1 | 2/2015 | Neuhauser et al. | |
| 2015/0052503 A1* | 2/2015 | Ligman | G06F 11/3664 |
| | | | 717/125 |
| 2015/0058232 A1* | 2/2015 | Persinger | G06Q 50/18 |
| | | | 705/311 |
| 2015/0370804 A1* | 12/2015 | Weber | G06F 40/106 |
| | | | 707/738 |
| 2016/0098697 A1* | 4/2016 | Dunsmore | G06F 11/0778 |
| | | | 705/39 |
| 2016/0164757 A1* | 6/2016 | Pape | G06F 11/3082 |
| | | | 709/224 |
| 2016/0292729 A1* | 10/2016 | Grunewald | G06Q 30/0255 |
| 2017/0091807 A1* | 3/2017 | Liu | G06Q 30/0277 |

* cited by examiner

METHOD, DEVICE AND ARRANGEMENT FOR MEASUREMENT OF APP USAGE BASED ON VISUAL CHARACTERISTICS

PRIORITY

This application is a U.S. national application of the international application number CT/FI2015/050675 filed on 8 Oct. 2015 the contents of which is incorporated herein by reference.

The invention relates generally to computer applications running on different technological platforms. Particularly, however not exclusively, the present invention pertains to a device, arrangement and method for enabling visual characteristics based recognition of the context of a user interface and user behavior associated with it, such as of screen activity, identity of a running application or other content.

BACKGROUND

Different media measurement, user profiling, Internet panel, mobile panels, digital marketing tools and other analytics solutions require obtaining and analyzing device usage data from a target population and often also so-called reference groups. The evident goal is to get grasp on the underlying trends, habits, problems and needs, whereupon better suiting, better functioning, more accurate and also larger audience reaching products, services and marketing efforts are easier to design among other potential uses of such data.

Many of the contemporary analytics tools capable of mining data indicative of user behavior e.g. on mobile or Internet platforms seem to concentrate on tracking a number of relatively general technical indicators such as predetermined HTTP (Hypertext Transfer Protocol) events and e.g. active thread/application/window names, or alternatively, exploiting application and/or platform-specific, highly tailored data collection technologies. These approaches, although potentially providing feasible results, limit the versatility of the obtainable data or complicate and slow down the development of the associated monitoring and analytics tools as they have to be particularly tuned for each monitored product, respectively. In many cases such solutions further fail to provide validation of actual user behavior with a particular service, for instance.

Meanwhile, the evolution of media and Internet services such as web sites or web-accessible services is faster than ever. Both wired (e.g. desktop computers and smart TVs) and wireless devices (e.g. tablets, phablets, laptops and smartphones) have already changed the way people access and engage with digital services, and as a result, both the business and technological landscapes are encountering constant turbulence.

Further, user behavior is changing quickly due to parallel use of multiple competent devices ranging from the aforesaid smartphones to tablets, and e.g. from laptops to smart TVs. Particularly in mobile context, the consumers already have a choice from a library of over a million applications, or 'apps', available in the app stores, and they can opt to use not only native applications but also e.g. HTML5 (Hypertext Markup Language 5) applications, widgets, web sites, or something in between.

The information resulting from the data collection and mining tools of the aforementioned traditional type is simply not adequate anymore in the light of growing demand for digital analytics and audience estimations. Instead, it has become important to be able to validate what is the app that is being used by the user at any given time, and to be able separate that from other technical traces of device activity.

A scalable media measurement solution is thus desired. Preferably, it would be capable of both mobile and Internet measurements and adapt to different modern, device-wise often very fragmented, use scenarios better than the aforementioned solutions concentrating on monitoring a number of predefined elements and events on certain specific platforms only based on e.g. data traffic arising from user-service interactions.

For example, both the markets considering e.g. hedge funds, portfolio analysts, and investment banks, and mobile/Internet industry players such as device vendors, carriers, app developers, and Internet companies all alike, would prefer obtaining substantially real-time insight into the actual use of Internet services—whether used through native apps, HTML5 software, web sites, or e.g. widgets. Holistic projections of the digital audience, over the long-tail of properties, conducted regularly, e.g. on a daily basis, would undoubtedly be rather useful in supporting fact-based decisions, whether it is about investing into a stock, analyzing competition, or understanding consumer behaviors to gain new users, minimize churn or to increase user engagement, for instance. Instead of survey data or data on installations, on-device metered reach and engagement data on total and unduplicated usage could indeed be offered e.g. through a dynamic web reporting dashboard and integrated business intelligence tools, providing near real-time statistics and various options for users to extract relevant data cuts and correlations themselves, whenever it is needed.

Various events, applications, services, etc. having regard to e.g. user engagement with a terminal device could be monitored and recognized based on data indicative of display content and thus also of display usage in the terminal. Just like a physical fingerprint characterizing the unique configuration of friction ridges of a human finger, a so-called digital fingerprint could be established from data shown in the display to describe the associated visual characteristics. Depending on method selected for establishing the fingerprints, they could be constructed with uniqueness in mind so that afterwards, based on a mere fingerprint the original data, e.g. source application name or activity type, could be resolved. For example, a fingerprint could be associated with a certain application via a mapping table linking applications and fingerprints established therefrom.

Therefore, by comparing a target fingerprint against predefined reference fingerprints, each of which (references) being also linked with desired metadata describing the source data or 'data source' to the desired extent, the target fingerprint could be conveniently associated with the correct source data. A matching or best-matching pre-established fingerprint would be first determined for the target fingerprint by executing a search/matching algorithm, and then the metadata associated with that (best-)matching pre-established reference fingerprint would be retrieved to uncover the source data to the available detail.

Through such visual fingerprinting, a variety of applications and related activities could indeed be uniquely identified and their usage tracked for a myriad of purposes. For example, user terminals could send image data to a network service that hosts the reference library and performs the matching and related identification, and potential subsequent analysis. However, a further snag remains in the creation of the reference (fingerprint) library itself.

One approach to provide the reference library resides in expert based generation, i.e. a plurality of trained experts initially takes or triggers taking screenshots of different applications or events involving characteristic display activity and manually link it with source data such as application identity data, e.g. application name or type, in the reference library.

Such tedious expert based approach is technically applicable, but it has its evident drawbacks at least if used as the sole solution for the reference library generation, considering the manual workload required, associated potential human errors, typically still somewhat limited coverage and easily rather lengthy update delay between e.g. a launch of a new application and its actual introduction in the reference library in the form of a digital fingerprint and related metadata.

SUMMARY

It is the objective of the invention to at least alleviate one or more drawbacks related to the prior art.

The objective is achieved by the various embodiments of a method, an arrangement and a device as defined in the appended claims.

In one aspect, a method for cultivating a digital reference library for digital content, such as a plurality of applications, linking content identity information and visual characteristics data, comprises receiving content identity information and visual characteristics data representing and being automatically created based on the on-screen appearance of the content, such as application or other content item, in the terminal device by predetermined observation logic running in the terminal device for establishing and transmitting at least visual characteristics data, adapting the digital reference library by updating an entry therein having regard to said content with the visual characteristics data in the received or processed form, wherein the entry is addressable with the content identity information.

In a preferred embodiment, the content identity information is received from the terminal device that provides the visual characteristics data. Preferably the identity information is indeed automatically established either by the terminal or e.g. a network entity such as a server. Alternatively or additionally, a user of the terminal device could input the identity information or at least part thereof via the UI of the terminal optionally responsive to a prompt triggered by the observation logic. This option could be exploited e.g. in scenarios wherein the automated logic is incapable of (at least fully) extracting the identity information having regard to the screen content autonomously/automatically.

In one embodiment, the method particularly comprises determining whether the reference library includes an entry for the particular content item in question based on the received identity information, and in the case of previously non-existing content establishing, and in the case of already-existing application, supplementing an entry in the reference library for the indicated application.

In an embodiment, the content identity information indicates at least one element selected from the group consisting of: application identifier (of the on-screen application), application name of the same, application manufacturer, application type or class, web page address or name, web site address or name, event occurring, activity performed, operating system, and purchase or payment.

In case of a web browser application running in a terminal device, the identity information and the visual characteristics may relate to the browser application itself and/or the content shown therethrough, which may refer to a web page, web site or web application, for instance.

The application the visual on-screen characteristics of which are captured and provided along with identity information for updating the reference library, may be or comprise a so-called native application. Alternatively it may refer to the aforesaid web application, or 'web-based application', running through a browser or e.g. an emulated application.

In an embodiment, visual characteristics data representing the displayed on-screen appearance of content (item), such as an application, in a terminal device without application identity information is received and this new data is matched as is or in processed form with the existing data in the entries to find the identity of a matching content item. The visual characteristics data may be sent by screen or application usage monitoring logic running in the terminal device.

Accordingly, the identity information associated with the matching entry may be provided forward. The information may be utilized in the determination of content, such as application, usage statistics (e.g. count/frequency), for example, as the visual characteristics data provided by the terminal devices reflects the content/applications that are active and in use at such devices. The derived statistics or other deliverables may be exploiting in designing a digital marketing campaign or in the optimization of technical resources, such as computing, storage, UI (user interface) and/or communication resources, to provide e.g. enhanced content, device, service or network usage experience to the terminal users.

In one other aspect, a method for supplying data to remotely cultivate a digital content reference library, to be executed by an electronic terminal device capable of visually displaying digital content to a user and communicating with a communications network, comprises establishing, by automatic observation logic, visual characteristics data representing the on-screen appearance of digital content, such as application, shown via a display of the terminal device, and transmitting the visual characteristics data to a remote server for updating a digital content reference library thereat linking content identity information with associated visual characteristics data in the received or processed form.

Preferably, the method further incorporates determining and sending content identity information identifying the content item, such as application or web page, underlying the visual characteristics data to the remote server, preferably with the data. The determination may be completely automated or at least partially based on user input responsive to e.g. a prompt as mentioned hereinbefore.

In a further aspect, a server arrangement accessible via a communications network, optionally cellular network and/or the Internet, comprises a communication module configured to receive content identity information and visual characteristics data representing and being automatically created based on the on-screen appearance of the content, such as application or other content item, in the terminal device by predetermined observation logic running in the terminal device for establishing and transmitting the visual characteristics data, a digital reference library comprising a plurality of entries, an entry linking content identity information with visual characteristics data representing the on-screen appearance of the content, and a digital reference library management module configured to adapt the digital reference library by updating an entry therein having regard to said content with the visual characteristics data in the received or processed form, wherein the entry is addressable with the content identity information.

In a further aspect, a terminal device for accessing digital content and communicating with a communications network, optionally cellular network or the Internet, comprises
- a display for visualizing digital content, such as application running in the terminal, to a user,
- an observation module configured to automatically establish visual characteristics data representing the on-screen appearance of digital content shown via the display, such as application, and
- a communication module configured to transmit the visual characteristics data to a remote server for storage or analysis.

In an embodiment, the observation module is further configured to determine content identity information, such as application identifier, associated with the digital content based on which the visual characteristics data has been established. As alluded to hereinbefore, the identity determination may be automatic or at least partially based on user input.

In an embodiment, the observation module is configured to capture image data such as a screenshot data (screen capture data) of the display view and establish the visual characteristics data based thereon to represent the on-screen appearance of the content.

In an embodiment, the visual characteristics data includes at least one vector structure or other data structure incorporating a plurality of features indicative of the characteristics of the on-screen appearance of the content at one or more time instants. Preferably, the visual characteristics data is or comprises processed, compressed and/or filtered data established based on image data such as screenshot data representing the on-screen appearance. Advantageously the characteristics data is thus provided in a memory-efficient (e.g. less memory space consuming) format.

In an embodiment, the observation module is configured to detect switchover from a previous content, e.g. one application, shown on the display to a next content, e.g. one other application, shown on the display, and utilize such detection as a condition for capturing image data to establish the visual characteristics data representing the on-screen appearance of the next content. A programming interface such as an API (application programming interface) provided by the terminal may be utilized for detecting the switchover between content/applications. The switchover detection mechanism may, depending on the technical platform (e.g. iOS™), be capable of detecting a general switchover between two different content items such as applications, but is not necessarily able to identify the concerned applications or the next application, i.e. the identities remain anonymous to the interested entity such as the observation module.

Preferably, the observation module is further configured to monitor up-to-date overall list, task manager, or other accessible indication of content items, such as applications, that are active or running in the terminal, e.g. active on display or in the background. An interface may be again provided for the purpose. The content items may be indicated via their identity information such as application identifier (application name, for example).

The module is preferably configured to monitor both the aforesaid detection information and the information about active/running content indicative of active on-screen and background content to determine a condition and e.g. time period for capturing the image data with proper identity information.

For example, upon detecting a new content item, e.g. application, among the active/running ones and detecting a substantially simultaneous switchover between applications, it may be determined that the new content item has just become active in the display (i.e. from the scratch, without already running and being shown in the display prior to that at some point), whereupon image data captured represents that particular content item in the foreground, such as a freshly launched new application, until the subsequent switchover detected. The appropriate content identity information associated with the shown content is determined based on or extracted from the list or other indication of content items as contemplated hereinbefore.

The previously presented considerations concerning the various embodiments of the methods may be flexibly applied to the embodiments of the arrangement or terminal mutatis mutandis, and vice versa, as being appreciated by a person skilled in the art.

The utility of the present invention arises from multiple issues depending on each particular embodiment thereof. Instead of manually creating a data stream of known matches between image (on-screen) characteristics and e.g. corresponding app names, which is error-prone and tedious, basically continuously or regularly executable process, and establishing a reference library for content matching and related usage analysis based on that, the terminal devices may be harnessed into automatically collecting visual characteristics data based on screenshots/screen capture data, i.e. image data, and providing the data preferably in a processed such as compressed, vectorised and/or filtered form to a central entity that associates the identity information of the content items with the corresponding visual characteristics data in the entries (or 'records') of a maintained collective data structure, or 'library'. The identity information is advantageously automatically determined as well.

The identity information may be determined by the same terminal that establishes the visual characteristics data for the particular content either completely automatically based on predefined detection logic or in a user-assisted manner, or it may be provided by external entity such as a server potentially supplying the terminal device with the content or by an intermediate element such as a proxy.

Solely manual labor-based maintenance of the reference library could be possible and feasible when the target content space the use of which is to be monitored is very limited, but the present invention enables practically unlimited scope for different content or media usage measurements in terms of a measurable content space of content items as the user terminals and potential other devices facilitate automatically establishing and keeping the reference library up-to-date by providing visual characteristics data and identity information relating to the content consumed and accessed via the devices also having regard to new content items, such as applications, not previously presented in the reference library by any of its existing entries. The mechanism thereby exploits crowdsourcing type of content data acquisition for building and maintaining the reference library. Manual or 'expert' type data provision is still naturally possible in addition to the suggested approach as explained herein.

By the various embodiments of the present invention, a digital reference library of visual characteristics, or digital fingerprints, may indeed be conveniently established and also maintained (updated) through the utilization of the automated observation logic at the terminals and optionally other elements such as network elements providing e.g. identity information. Accordingly, following the necessary initial build-up phase of the library and switching over to the maintenance and matching phase, comparing the contents of the resulting, inherently comprehensive reference library, with the inputted visual characteristics data to find a match between them for content identification purposes becomes more efficient and reliable as the amount of accumulated data in the reference library is both complete and up-to-date.

The present solution thus provides relief in both the creation of new entries in the library for new content (items), such as new apps, and maintenance of the existing entries/ records. Having regard to the actual matching operations for which purpose the reference library is usually being built in the first place, the comprehensive, dynamically updated and increasing image or generally visual characteristic data provides in any case incremental value; there's more data and/or more current data to compare the initially anonymous (unidentified) input data with to determine the actual identity behind the input data for subsequently updating the related content usage statistics, etc.

One major advantageous aspect resides in maximizing or at least increasing the variance in the characteristic data hosted by the library as different types of terminals (e.g. desktop computers, laptops, tablets, cell phones, phablets, smartphones, etc.) running different platforms (e.g. operating system (OS) such as Android™ or iOS™, or Windows™) are typically utilized in the library cultivation and maintenance procedures. While one very specific, predefined characteristic can provide a good way to map e.g. a home screen (app or OS/platform), it is practically impossible to know beforehand how to visually trace and thus establish the visual characteristics data for all other possible content the usage of which is worth monitoring. For example, some apps can be better matched with color vectors, some apps with data on the screen structure, some apps with shapes or menu positioning etc. Instead of constantly relying on best-effort guesses of how to establish the visual characteristics data, a variety of approaches may be applied, describing e.g. the top colors (e.g. five most used colors), vectors that describe the contrast between different sides of the screen, vectors that describe the dominant shapes in the images, and so forth in the automated observation procedures. The richness of this way versatilely collected data enables scaling up the data collection platform and overall automation of the reference library creation.

The suggested solution also enables clever local identification (e.g. application name, application file name or other identifier) of current on-screen content on platforms, e.g. at least certain versions of iOS™, not directly providing such identification information to the applications, such as the observation application, the present invention could be embodied as.

Additional benefits of the embodiments of the present invention will become clear to a skilled reader based on the detailed description below.

The expression "a number of" may herein refer to any positive integer starting from one (1).

The expression "a plurality of" may refer to any positive integer starting from two (2), respectively.

Different embodiments of the present invention are disclosed in the attached dependent claims.

BRIEF REVIEW OF THE DRAWINGS

Few embodiments of the present invention are described in more detail hereinafter with reference to the drawings, in which FIG. 1 illustrates the embodiments of an arrangement and terminal device in accordance with the present invention in connection with a potential use scenario.

DETAILED DESCRIPTION

Figure 1:
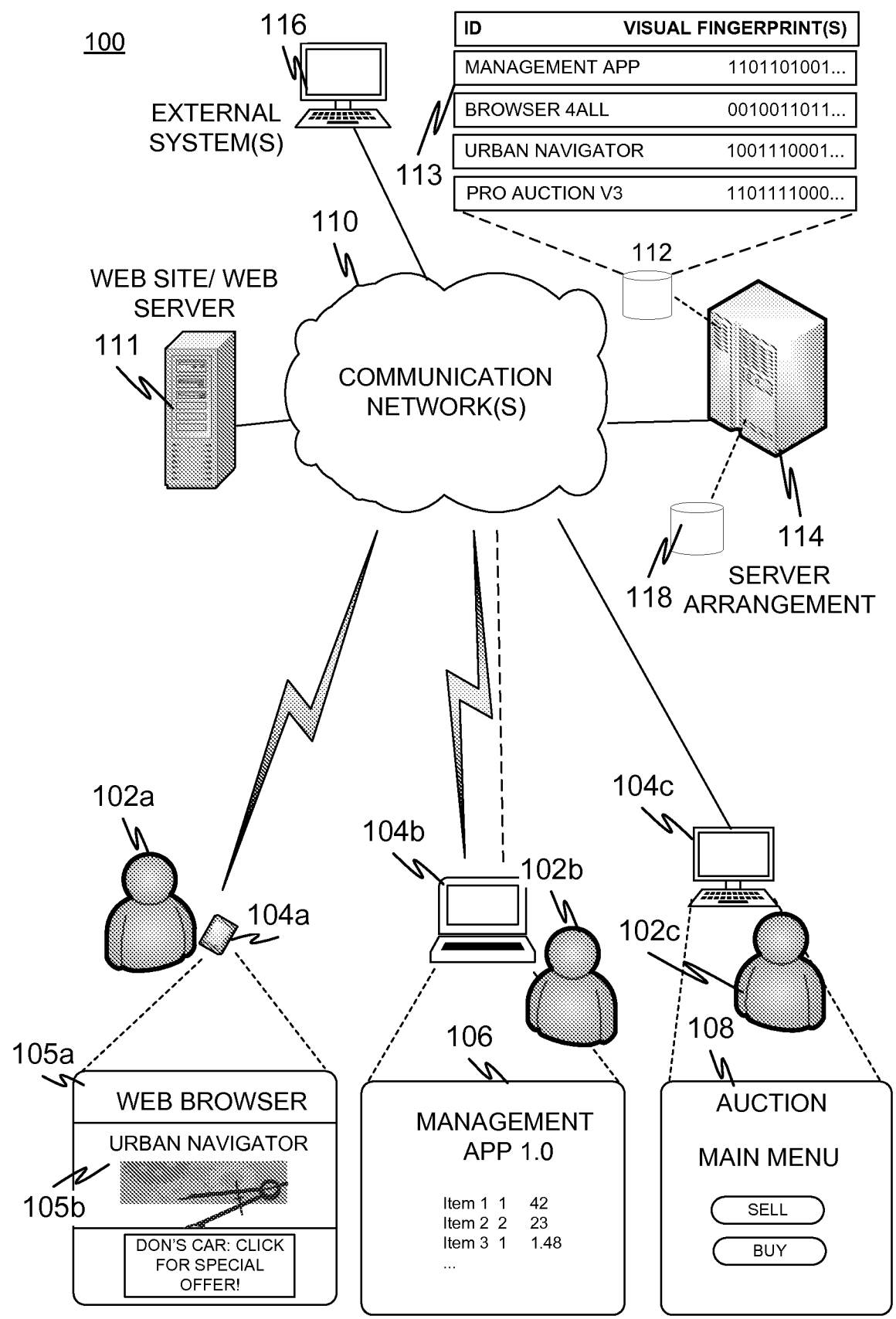

FIG. 1 shows, at 100, one merely exemplary use scenario involving an embodiment of an arrangement 114 in accordance with the present invention and few embodiments 104a, 104b, 104c of terminal devices in accordance with the present invention as well.

Network 110 may refer to one or more communication networks such as the Internet, local area networks, wide area networks, cellular networks, etc., which enable terminals 104a, 104b, 104c and server arrangement 114 to communicate with each other. Further elements such as a web server 111 and/or external systems 116 for utilizing data provided by the arrangement 114 and/or supplying data, optionally control data, to the arrangement 114, may be included in the established overall system.

The arrangement 114 may be implemented by one or more electronic devices such as servers and potential supplementary gear such as a number of routers, switches, gateways, and/or other network equipment. In a minimum case, a single device such as a server is capable of executing different embodiments of the method and may thus constitute the arrangement 114 as well. At least part of the devices of the arrangement 114 may reside in a cloud computing environment and be dynamically allocable therefrom.

The terminals 104a, 104b, 104c may refer to mobile terminals 104a such as tablets, phablets, smartphones, cell phones, laptop computers 104b or desktop computers 104c, for instance, but are not limited thereto. The users 102a, 102b, 102c may carry mobile devices 104a, 104b along while heavier or bulkier devices 104c often remain rather static if are not basically fixedly installed. These devices may support wired and/or wireless network connections. For example, wired Ethernet or generally LAN (local area network) interface may be provided in some devices 104b, 104c whereas the remaining devices 104a, 104b may dominantly support at least cellular or wireless LAN connections.

The terminals 104a, 104b, 104c are provided with observation and communication logic e.g. in the form of a computer (processing device) executable software application via a network connection or on a physical carrier medium such as a memory card or optical disc. The software may be optionally bundled with other software. The logic is harnessed to obtain image data having regard to digital content shown on the display device, which is typically integral with the terminal 104a, 104b, 104c with reference to e.g. a so-called flat-screen display (LCD, OLED, etc.) or a touchscreen.

The content may refer to, in particular, visual appearance of executable computer applications 105a, 105b, 106, 108 that are common content items running in the terminals 104a, 104b, 104c. Quite typically an application has a characteristic visual appearance based on which the application itself and/or content shown via it may be recognized for usage tracking purposes, for instance.

Alternatively or additionally, the content may refer to images (or image files), videos (files), or e.g. underlying technical platform such as the operating system (OS) which may have a characteristic visual appearance (e.g. a so-called desktop view or main view, or some menu view).

Some applications 105a such as web browsers are occasionally used to visualize other content such as other applications, i.e. web applications 105b. The observation logic may be configured to obtain image data of the host application 105a and/or the embedded application 105b.

The obtained image data may be subjected to analysis at the terminals 104a, 104b, 104c. For example, a number of characteristic vectors may be determined therefrom. The analysis results preferably comprise visual characteristics data extracted from the image data to be used in the reference library 112 as such and/or in processed form. In some embodiments, the captured image data or portion thereof could be applied as such in the visual characteristics data.

In addition to visual characteristics data such as data extracted from the screen captures or 'screenshots', also identity, or 'identification', information such as application name (e.g. filename, actual application name, and/or other identifier) is preferably obtained by the terminal 104a, 104b, 104c and linked with the corresponding visual characteristics data.

The terminals 104a, 104b, 104c are configured to transmit visual characteristics data of content items, such as applications, to the server 114 arrangement optionally in batches. The transmissions may be timed, substantially immediate following the acquisition of the data, and/or be based on other predefined triggers.

Preferably the observation and communication logic acts in the background so that any user actions are not necessary for its execution, and the logic may actually be completely transparent to the user (by default not visually indicated to the user, for example).

In some embodiments, however, the user may be requested to validate or enter identity information for image data or derived visual characteristics data so that it is linked with correct content. For example, if content identity information cannot be automatically determined for some technical reason, not at least completely or to desired extent, or the estimated accuracy of the determined identity remains below a predefined level of certainty, the user may be prompted via the UI of the terminal 104a, 104b, 104c, such as display, to input or verify the identity information by manual selection or more comprehensive input (typing in the identifier, for example).

Yet in some embodiments, the external elements 111, 116 may be capable of providing identity information to the arrangement 114. For example, in the case of a web application 105b supplied by server 111 to the terminal 104a, 104b, 104c, the server 111 may signal the identity information of the application 105b to the arrangement 114 as the server 111 may be aware of the active on-screen web application 105b running in the terminal 104a. The awareness may be based on e.g. user interaction with the web application as detected by the server 111.

Reverting to the determination of identity information, such as application ID, in the terminals 104a, 104b, 104c, the associated observation and communication logic may be configured to request or retrieve such data indicative of the identity of current on-screen content, when readily available, from a predefined location or via predefined internal interface, such as API (application programming interface).

In some embodiments, the identity information relating to the on-screen content may not be as straightforwardly available to local applications. This may be the case e.g. with certain versions of iOS™ operating system based platforms.

Even in these scenarios, the terminal 104a, 104b, 104c may be configured so as to derive the correct identity information based on a plurality of data inputs one could call as circumstantial evidence.

For example, an indication of a switchover from one application, shown on the display to a next application, shown on the very same display, could be obtainable. The indication would not actually identify the applications themselves, but just the switchover.

Further, an indication of currently running active visualized or background applications (and/or other content, depending on the platform) could be obtainable e.g. from a task manager.

By combining these two data inputs, i.e. the switchover signal and entry of new application in the list of active/running applications, it could be concluded by the observation logic that the new application just added to the list is very likely the one shown in the display, i.e. a foreground application, until another switchover is detected. Therefore, the visual characteristics data established based on screen view(s) between the instant of first switchover/addition of the new application in the list and a subsequent switchover could be automatically associated with the identity of the new application.

In some embodiments, detecting the addition of a new application in the list of running or active applications could be utilized as identity indication of the on-screen content (i.e. new application) even without relying on the aforesaid switchover or corresponding data. For example, one or few images could be substantially immediately or at least within a relatively short period of e.g. few seconds, captured for establishing the visual characteristics data to be associated with the identity of the new application. This technique could be based on an assumption that a just launched new application typically remains on the screen at least for few seconds.

The server arrangement 114 comprises or is at least functionally connected to a reference library 112 associating visual characteristics data of content items such as applications with related identity information, such as application IDs (typically application names). In practice, the library 112 may be implemented as one or more databases or other applicable data structures, the actual construction of which is not in the fulcrum of this invention.

The library 112 comprises, in a functional sense, a plurality of entries 113. Each entry, or 'record', may contain visual characteristics data/number of visual fingerprints such as characteristics (feature) vectors indicative of the on-screen appearance of the particular content item. Yet, the entry may contain or indicate (e.g. link) identity information of the content such as application name and/or other content identifier, such as classification or type data.

During library 112 update or establishment procedure, the server arrangement 114 preferably obtains both identity information and visual characteristics data so that a correct entry associated with the indicated content identity is updated with the visual characteristics data.

On the other hand, during a matching procedure, which may take place upon monitoring usage frequency of different content items for determining related statistics and optionally optimizing e.g. marketing efforts based on that, the input may include visual characteristics data, i.e. a digital fingerprint, of the content such as application to be recognized, whereupon the library is searched for a match to retrieve the related identity information. The identity information may be then utilized in updating e.g. the count figure maintained for the particular content item in question.

Further information may be included as well in the library, optionally comprising e.g. identity/entry-specific frequency or count data having regard to usage frequency of the content (item) detected and optionally relates statistics. Alternatively, such data may be hosted by a separate data structure 118, which may be addressable with the content identity information, for example.

A screen view image of content such as application may in some embodiments be at least partially or coarsely reconstructed utilizing the visual characteristics data stored.

Figure 2:
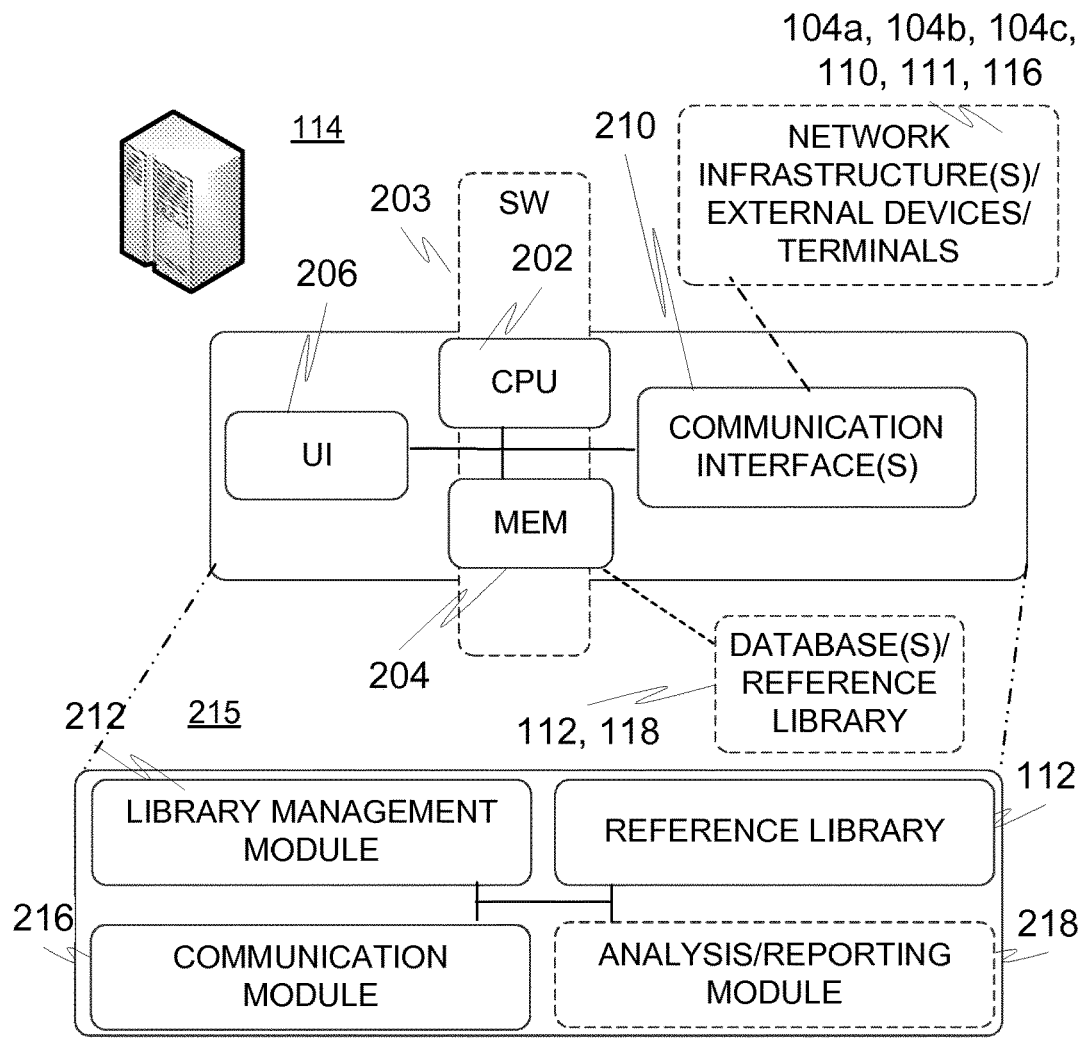
FIG. 2 is a block diagram representing the internals of an embodiment of the arrangement.

FIG. 2 is a block diagram representing the internals of an embodiment of the arrangement 114 in accordance with the present invention.

The arrangement 114 may be physically established by at least one electronic device, such as a server computer. The system 114 may, however, in some embodiments comprise a plurality of at least functionally connected devices such as servers and optional further elements, e.g. gateways, proxies, data repositories, firewalls, etc. At least some of the included resources such as servers or computing/storage capacity providing equipment in general may be dynamically allocable from a cloud computing environment, for instance.

At least one processing unit 202 such as a microprocessor, microcontroller and/or a digital signal processor may be included. The processing unit 202 may be configured to execute instructions embodied in a form of computer software 203 stored in a memory 204, which may refer to one or more memory chips separate or integral with the processing unit 202 and/or other elements.

The software 203 may define one or more applications for maintaining the reference library by inserting data thereto or fetching data therefrom and optionally for determining required usage statistics such as use frequencies or counts of various content items. A computer program product comprising the appropriate software code means may be provided. It may be embodied in a non-transitory carrier medium such as a memory card, an optical disc or a USB (Universal Serial Bus) stick, for example. The program could be transferred as a signal or combination of signals wiredly or wirelessly from a transmitting element to a receiving element.

One or more data repositories such as database(s) 112, 118 of preferred structure may be established in the memory 204 for utilization by the processing unit 202. The repositories may physically incorporate e.g. RAM memory, ROM, Flash or other non-volatile (RAM) memory, magnetic/hard disc, memory card, etc. The repositories host the reference library, for example.

The UI (user interface) 206 may provide the necessary control and access tools for controlling the arrangement (e.g. definition of library management rules or data analysis logic) and/or accessing the data gathered and calculated (analysis results, statistics, identity information, visual characteristics data, etc.). The UI 206 may include local components for data input (e.g. keyboard, touchscreen, mouse, voice input) and output (display, audio output) and/or remote input and output optionally via a web interface, preferably web browser interface. The system may thus host or be at least functionally connected to a web server, for instance.

Accordingly, the depicted communication interface(s) 210 refer to one or more data interfaces such as wired network (e.g. Ethernet) and/or wireless network (e.g. wireless LAN (WLAN) or cellular) interfaces for interfacing a number of external devices and systems with the system of the present invention for data input and output purposes, potentially including control. The arrangement 114 may be connected to the Internet for globally enabling easy and widespread communication therewith. It is straightforward to contemplate by a skilled person that when an embodiment of the arrangement 114 comprises a plurality of functionally connected devices, any such device may contain a processing unit, memory, and e.g. communication interface of its own (for mutual and/or external communication).

Primarily considered from a functional or conceptual standpoint, see the lower block diagram at 215, the arrangement 114 comprises a library management module 212 for managing the library 112 and keeping it up-to-date based on the received identification and visual characteristics, or 'fingerprint', data. Yet, it may process the received data into storage format of the library 112 by compressing it, extracting features therefrom, etc. The module 212 is preferably also configured to retrieve the requested data from the library 112 for analysis purposes, such as identity information corresponding to an indicated visual characteristics data. For the purpose, the module 212 may apply a predefined matching algorithm and related decision criteria for determining the identity information (if any) for the indicated visual characteristics data input.

The reference library 112 is the element or entity that stores the visual characteristics data and the related identity information, or at least indication such as link thereto. It 112 thus associates detected visual characteristics of content items with corresponding identity information of the items. It 112 may host further data as well such as usage frequency or 'count' data that may be utilized in determining various usage statistics. In terms of data management and storage, the library 112 may be physically constructed from one or more data structures such as databases, optionally physically distributed structures or databases, which are then functionally linked.

Communication module 216 responds to external data inquiries (e.g. requests of desired statistics, identity information and/or visual characteristics data) and receives external data such as visual characteristics data from the terminals and associated identity information. The interface(s) 210 are utilized for these purposes.

Finally, a reporting or analysis module 218 may be included (marked with broken line) for executing analysis actions on the stored data 112 such as determination of desired content or media usage statistics and/or digital audience estimates (user estimates).

Figure 3:
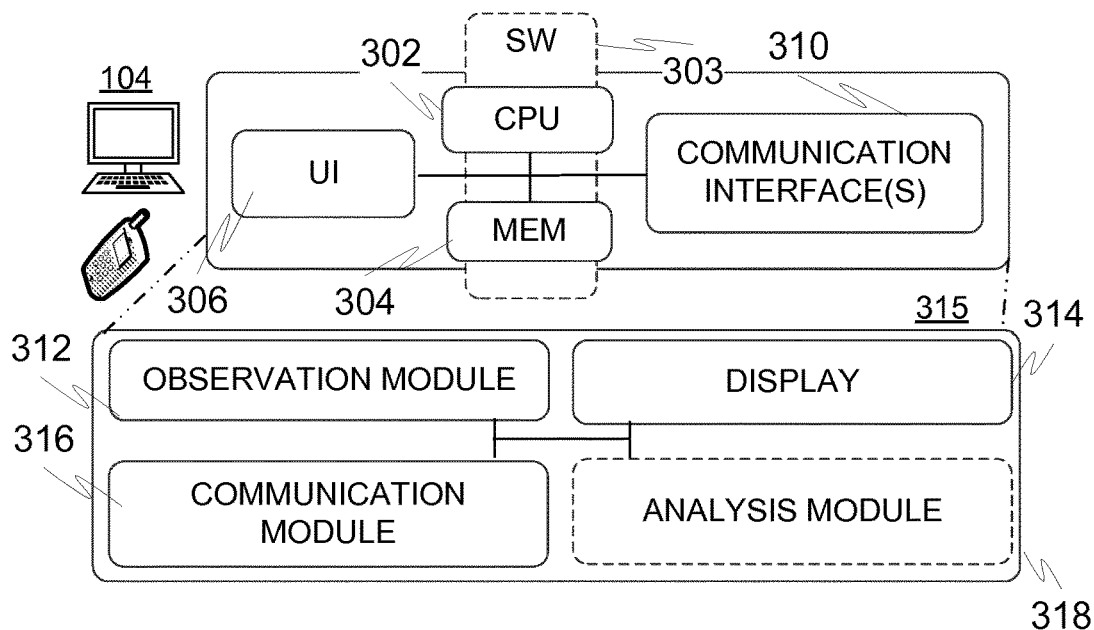
FIG. 3 is a block diagram representing the internals of an embodiment of the terminal device.

FIG. 3 is a block diagram representing the internals of an embodiment of the terminal device 104, which may refer to any terminal of 104a, 104b, 104c, for example. In congruence with the server 114, the terminal 104 includes a processing unit 302 and memory 304 for executing and storing program instructions 303 for gathering and providing visual characteristics data and preferably identity information, respectively. Yet, the memory 304 stores other data such as the visual characteristics data. Communication interface 310 may include at least one wired (e.g. Ethernet or other LAN) and/or wireless (e.g. WLAN, cellular such as 3G or 4G) communication interface, typically a transceiver for transferring data, including receiving content and transmitting visual characteristics data and preferably associated identity information.

The UI 306 refers to at least a display (screen), the on-screen views of which are used to determine visual characteristics data to be associated with identity information of the content items producing the views. Still, the UI 306 may include e.g. user input interface such as touchscreen functionality in connection with the display, a separate keypad, keyboard, mouse, voice input, etc. Such input interface may be configured to obtain e.g. definition or validation/verification of content identity from the user.

Again, at the lower portion 315 of the figure, more functional or conceptual approach is taken. An observation module 312 is configured to obtain the on-screen display data, i.e. image data, e.g. via applicable internal interface(s) of the terminal 104 in order to establish the visual characteristics data. Predefined feature or feature vector criteria may be applied to establish the data to be transmitted from the original on-screen image data, for example.

To monitor on-screen activity or view in the first place, the device shall include a display 314, which may refer to a conventional display such as LCD (liquid-crystal display) or OLED (organic LED) display, or a functionally corresponding data visualization equipment, e.g. a projector, so that the visual characteristics data is really generated and thus obtainable via the interface(s) or through other routes internally at the device 104.

The visual characteristics data may in some embodiments include a number of selected screen captures and/or data derived therefrom. Further, the observation module 312 is preferably configured to determine at least part of the identity information for the visual characteristics data, such as application name of the on-screen application in question.

The communication module 316 transmits the visual characteristics data and preferably identity information to the arrangement 114 via available physical communication interface(s) 310. It may further receive control data and/or update data for the observation logic from external sources such as the arrangement 114.

The analysis module 318 may be included to execute various optional monitoring and/or analysis activities in the terminal 104. For example, data traffic, application data, voice call data, messaging data, and/or e.g. network identities in range may be monitored, analyzed and/or logged. Such data may also be transmitted to external entities such as arrangement 114 for further analysis or storage.

Having regard to different embodiments of the modules of FIGS. 2 and 3, a person skilled in the art will appreciate the fact that the above modules and associated functionalities may be realized in a number of ways. A module may be divided to functionally even smaller units or two or more modules may be integrated to establish a larger functional entity. In case the arrangement 114 comprises several at least functionally connected devices, the modules may be executed by dedicated one or more devices or the execution may be shared, even with dynamic allocation, among multiple devices e.g. in a cloud computing environment.

Figure 4:
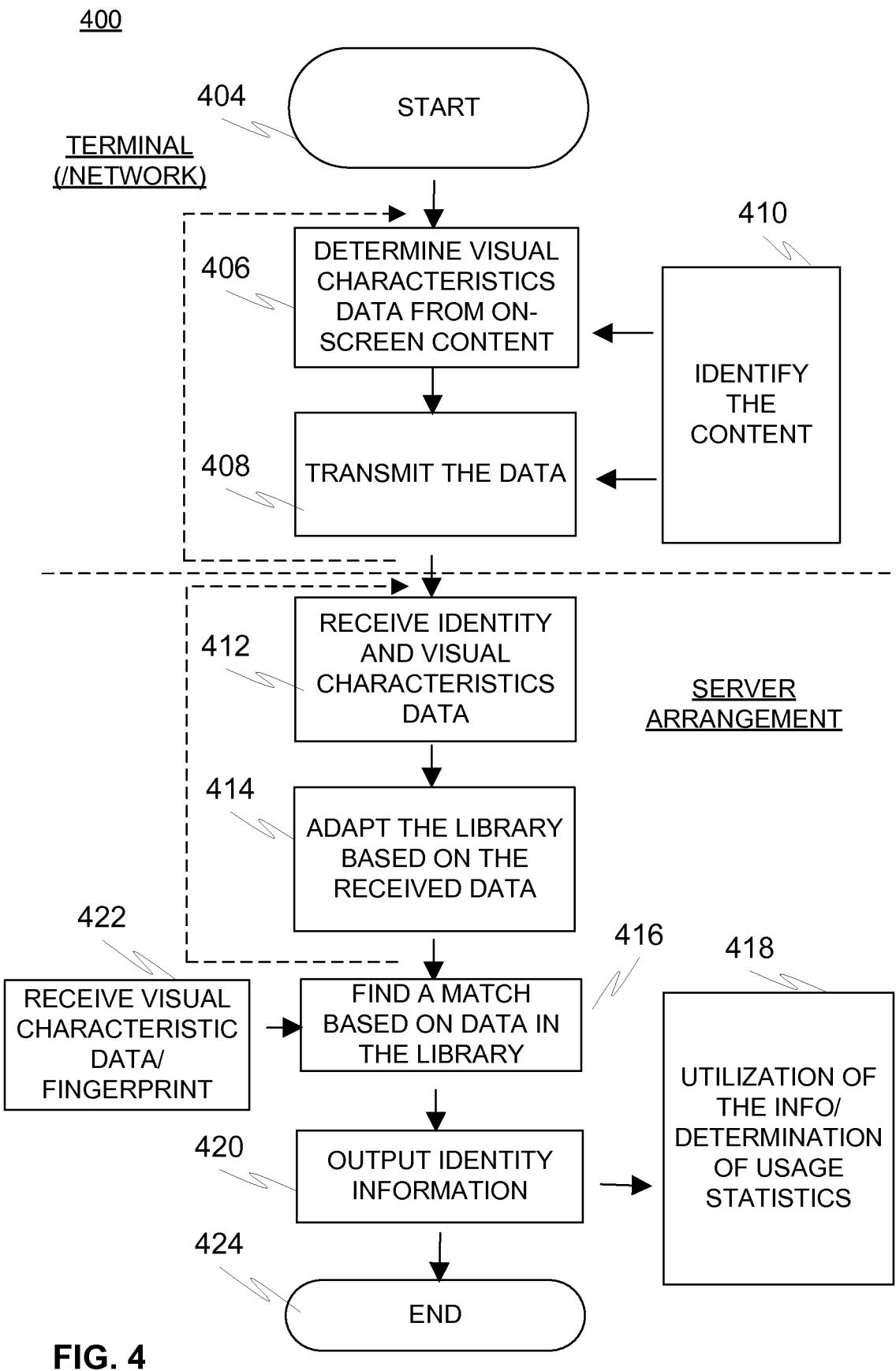
FIG. 4 is a flow diagram disclosing two embodiments of methods in accordance with the present invention.

FIG. 4 is a flow diagram 400 disclosing two embodiments of methods in accordance with the present invention.

The top half of the figure refers to an embodiment of a method incorporating activities typically executed by terminal(s) and optionally in some parts, other elements such as network elements (e.g. a web server or application server), whereas the bottom part refers to an embodiment of a method incorporating activities executed by the server arrangement.

At 404, referring to a start-up phase, the necessary preparatory actions are executed, which refers to both terminal and server side embodiments. The system hardware, such as at least one server apparatus with sufficient data processing, storage and communication capabilities, may be acquired and set up by loading it with appropriate control software. The communication connections relative to external systems may be established and tested. Run-time parameters and e.g. transaction and identifier analysis logic may be determined. A number of, typically a plurality of, terminals may be provided with compatible observation logic in the form of stand-alone or bundled software, for example. The associated configuration may be adjusted, optionally by the user.

Item 406 is about establishing at each concerned terminal, by automatic, preferably autonomously functioning observation logic, visual characteristics data representing the on-screen appearance of digital content, such as application, shown via a display of the terminal device.

At 410, the content identity information is determined by the observation logic running in the terminal and/or by an external entity such as application data-providing server, which may refer to a web server, for instance.

Item 408 is about transmitting the visual characteristics data and identity information, preferably by the same terminal, to a remote server for updating a digital content reference library thereat linking content identity information with associated visual characteristics data in the received or processed form.

At 412, content identity information and visual characteristics data are received at the server.

Item 414 is about adapting the digital reference library by updating an entry therein having regard to said content with the visual characteristics data in the received or processed form, wherein the entry is preferably addressable with the content identity information.

It may be determined whether the reference library already includes an entry for the particular content item in question based on the received identity information, and in the case of previously non-existing content item establishing and in the case of already-existing content item modifying or supplementing an entry in the reference library for the indicated application/content, which may refer to adding new visual characteristics data, changing the existing data, or replacing the existing data with the new data, for example.

Items 416-422 relate particularly to the utilization of the established digital content fingerprint library in the monitoring and keeping track of content usage at the terminals when the input data does not contain content identity information.

At 422, the server receives visual characteristic data, such as image characteristic vector(s), of the on-screen content from a terminal device comprising monitoring logic for capturing/determining and forwarding such data.

At 416, a search is executed in the library to find matching data and in the case of a match to retrieve the related identity information, which is then done at 420.

Related usage data deliverables such as log(s) may be updated including e.g. usage count/frequency data and outputted to local or external recipients at 418, which may refer to different applications, databases, computers, computer systems, digital services, etc.

The statistics may be utilized in determining e.g. digital marketing efforts or optimizing technical resources (computation, UI, storage, communication, etc.) for the systems serving the users/terminals.

Item 418 may be executed also in scenarios where the server is directly provided with content identity information together with the visual characteristics data, with reference to items 412-414, for example. Maintenance of content usage such as application usage frequency/count figures or other related statistics may begin; usage log may be updated with e.g. application identifier and related time data, etc.

At 424, the method execution is ended.

The dotted, only exemplary, loop-back arrows reflect the likely repetitive nature of various method items when executed in different real-life and potentially also substantially real-time scenarios wherein various on-screen content is consumed every now and then, whereupon the established system of terminal(s) and server(s) may perform related observation, communication and analysis tasks in response.

The scope is defined by the attached independent claims with appropriate national extensions thereof having regard to the applicability of the doctrine of equivalents, etc.

The invention claimed is:

1. A method for cultivating a digital reference library for digital content, such as a plurality of applications, linking content identity information and visual characteristics data, comprising:
receiving content identity information and receiving visual characteristics data associated with the content that the content identity information identifies, thus linking the content identity information and visual characteristics data, said visual characteristics data representing and being automatically created based on the displayed on-screen appearance of the content, such as application or other content item, in the terminal device by predetermined observation logic running in the terminal device for establishing and transmitting at least visual characteristics data, without application identity information;
matching the data as is or in processed form with the existing data in the entries of the library to find the identity of a matching content item;
determining usage statistics based on the identified, visual characteristics data;
and
adapting the digital reference library by updating an entry therein having regard to said content with the visual characteristics data in the received or processed form, wherein the entry is addressable with the content identity information,
wherein said automatic creating of visual characteristics data at the terminal device comprises detecting of a new content item among the executed ones, and capturing, substantially immediately or at least within few seconds, at least one image for establishing the visual characteristics data to be associated with content identity information of the new content item.

2. The method of claim 1, wherein content identity information and visual characteristics data associated with the content are automatically determined by the observation logic running in terminal device.

3. The method of claim 1, wherein the content identity information is at least partially created based on explicit user input in the terminal device.

4. The method of claim 1, wherein the content identity information is received from a network element, optionally a web or application server.

5. The method of claim 1, comprising determining whether the reference library includes an entry for the particular content item in question based on the received identity information, and in the case of previously nonexisting content establishing, and in the case of already-existing content supplementing, an entry in the reference library for the indicated application.

6. The method of claim 1, wherein the content identity information indicates at least one element selected from the group consisting of: application identifier of the on-screen application, application name, application manufacturer, application type or class, web page address or name, web site address or name, event occurred, activity performed, operating system, and payment or purchase action.

7. The method of claim 1, wherein the content item the identity information and visual characteristics data of which are provided in the library refers to at least one element selected from the group consisting of: application, native application, web application, browser, web site, web page, operating system, image and video.

8. A method for supplying data to remotely cultivate a digital content reference library, to be executed by an electronic terminal device capable of visually displaying digital content to a user and communicating with a communications network, comprising:
establishing, by automatic observation logic, visual characteristics data representing the displayed on-screen appearance of digital content, such as application, shown via a display of the terminal device, without application identity information;
matching the data as is or in processed form with the existing data in the entries of the library to find the identity of a matching content item;
determining usage statistics based on the identified, visual characteristics data;
and
transmitting the visual characteristics data to a remote server for updating a digital content reference library thereat linking content identity information with associated visual characteristics data in the received or processed form.

9. The method of claim 8, further comprising determining and sending, preferably automatically, content identity information identifying the content item underlying the visual characteristics data to the remote server.

10. The method of claim 9, wherein the determination is at least partially based on user input optionally responsive to a prompt indicated audibly and/or shown on the display.

11. A system comprising at least one terminal device and server arrangement accessible via a communications network, optionally cellular network or the Internet, the server arrangement comprising:
a communication module configured to receive content identity information and visual characteristics data associated with the content that the content identity information identifies, thus linking the content identity information and visual characteristics data, said visual characteristics data representing and being automatically created based on the displayed on-screen appearance of the content, such as application or other content item, in the terminal device by predetermined observation logic running in the terminal device for establishing and transmitting the visual characteristics data, without application identity information;
matching the data as is or in processed form with the existing data in the entries of the library to find the identity of a matching content item;
determining usage statistics based on the identified, visual characteristics data;
a digital reference library comprising a plurality of entries, an entry linking content identity information with visual characteristics data representing the on-screen appearance of the content; and
digital reference library management module configured to adapt the digital reference library by updating an entry therein having regard to said content with the visual characteristics data in the received or processed form, wherein the entry is addressable with the content identity information,
wherein the device is configured to create the visual characteristics data by detecting of a new content item among the executed ones, and capturing, substantially immediately or at least within few seconds, at least one image for establishing the visual characteristics data to be associated with content identity information of the new content item.

12. The arrangement of claim 11, wherein the management module is further configured to execute a matching algorithm among the data entries in the library for finding identity information for visual characteristics data received without content identity information.

13. The arrangement of claim 11, further comprising an analysis module configured to determine a number of content usage statistics, optionally frequency or count data, based on the visual characteristics data received.

14. A terminal device for accessing digital content and communicating with a communications network, optionally cellular network or the Internet, comprising:
   a display for visualizing digital content, such as application running in the terminal, to a user, an observation module configured to automatically establish visual characteristics data representing the displayed on-screen appearance of digital content shown via the display, such as of application, without application identity information;
   matching the data as is or in processed form with the existing data in the entries of the library to find the identity of a matching content item;
   determining usage statistics based on the identified, visual characteristics data;
   and
   a communication module configured to transmit the visual characteristics data to a remote server for storage or analysis,
   wherein the device is configured to detect a new content item among the executed ones, and is additionally configured to substantially immediately or at least within few seconds, capture at least one image for establishing the visual characteristics data to be associated with content identity information of the new content item.

15. The device of claim 14, wherein the observation module is further configured to determine, preferably automatically, content identity information, such as application identifier, associated with the digital content item based on which the visual characteristics data has been established.

16. The device of claim 14, wherein the observation module is configured to capture image data such as screen capture data of the display view and establish the visual characteristics data based thereon to represent the characteristic on-screen appearance of the content in a memory-efficient manner.

17. The device of claim 14, wherein the visual characteristics data includes at least one vector structure or other data structure incorporating a plurality of features indicative of the characteristics of the on-screen appearance of the content at one or more time instants.

18. The device of claim 14, configured to detect a new content item, optionally application, among the executed ones, and a switchover between applications, and subsequent to detection of the two, configured to capture image data shown on the display and associate with the identity information of the new content item.

19. A non-transitory computer program product comprising computer program code embodied on computer readable medium, when executed on a processor of computer, to perform receiving content identity information and receiving visual characteristics data associated with the content that the content identity information identifies, thus linking the content identity information and visual characteristics data, said visual characteristics data representing and being automatically created based on the displayed on-screen appearance of the content, such as application or other content item, in the terminal device by predetermined observation logic running in the terminal device for establishing and transmitting at least visual characteristics data, without application identity information: matching the data as is or in processed form with the existing data in the entries of the library to find the identity of a matching content item;
determining usage statistics based on the identified, visual characteristics data;
and
adapting the digital reference library by updating an entry therein having regard to said content with the visual characteristics data in the received or processed form, wherein the entry is addressable with the content identity information,
wherein said automatic creating of visual characteristics data at the terminal device comprises detecting of a new content item among the executed ones, and capturing, substantially immediately or at least within few seconds, at least one image for establishing the visual characteristics data to be associated with content identity information of the new content item.

20. A non-transitory computer carrier medium comprising the non-transitory computer program product of
receiving content identity information and receiving visual characteristics data associated with the content that the content identity information identifies, thus linking the content identity information and visual characteristics data, said visual characteristics data representing and being automatically created based on the displayed on-screen appearance of the content, such as application or other content item, in the terminal device by predetermined observation logic running in the terminal device for establishing and transmitting at least visual characteristics data, without application identity information;
matching the data as is or in processed form with the existing data in the entries of the library to find the identity of a matching content item;
determining usage statistics based on the identified, visual characteristics data;
and
adapting the digital reference library by updating an entry therein having regard to said content with the visual characteristics data in the received or processed form, wherein the entry is addressable with the content identity information,
wherein said automatic creating of visual characteristics data at the terminal device comprises detecting of a new content item among the executed ones, and capturing, substantially immediately or at least within few seconds, at least one image for establishing the visual characteristics data to be associated with content identity information of the new content item.

* * * * *